United States Patent
Lawrence et al.

(10) Patent No.: US 6,236,793 B1
(45) Date of Patent: May 22, 2001

(54) OPTICAL CHANNEL WAVEGUIDE AMPLIFIER

(75) Inventors: Brian L. Lawrence, Watervliet; Kevin J. McCallion, Albany, both of NY (US)

(73) Assignee: Molecular OptoElectronics Corporation, Watervliet, NY (US)

( * ) Notice: Subject to any disclaimer, the term of this patent is extended or adjusted under 35 U.S.C. 154(b) by 0 days.

(21) Appl. No.: 09/159,012

(22) Filed: Sep. 23, 1998

(51) Int. Cl.$^7$ ..................................................... G02B 6/02

(52) U.S. Cl. .......................... 385/132; 385/123; 385/124; 385/125; 372/6; 359/341

(58) Field of Search ..................................... 385/123, 124, 385/125, 126, 127, 128, 132; 372/6, 69, 70; 359/341

(56) References Cited

U.S. PATENT DOCUMENTS

| 3,590,004 | 6/1971 | Woodcock | 252/301.4 |
| 3,826,992 | 7/1974 | Friedl | 330/4.3 |
| 4,428,646 | 1/1984 | Lighty | 350/96.31 |

(List continued on next page.)

FOREIGN PATENT DOCUMENTS

| 0136047 A2 | 4/1985 | (EP) | H01S/3/06 |
| 0224070 A2 | 6/1987 | (EP) | H01S/3/06 |
| 0324541 A2 | 7/1989 | (EP) | H01S/3/06 |
| 0415167 A1 | 3/1991 | (EP) | H01S/3/06 |
| 0416301 A2 | 3/1991 | (EP) | C30B/33/06 |
| 0450603 A2 | 10/1991 | (EP) | H01S/3/25 |
| 0477898 A2 | 4/1992 | (EP) | H01S/3/06 |
| 0 510 883 A2 | 10/1992 | (EP) . | |
| 0 511 069 A1 | 10/1992 | (EP) . | |
| 61-228403 | 10/1986 | (JP) | G02B/6/12 |
| 62-069207 | 3/1987 | (JP) | G02B/6/12 |
| 02001831A | 1/1990 | (JP) . | |
| 6-34829 | 2/1994 | (JP) . | |
| 6-174955 | 6/1994 | (JP) | G02B/6/12 |
| 08-295524 | 11/1996 | (JP) . | |
| 8-316562 | 11/1996 | (JP) . | |

OTHER PUBLICATIONS

K. Suto et al., "Semiconductor Raman Laser with Pump Light Wavelength in the 800 nm Region," 1046 Journal of the Electrochemical Society 140(1993) Jun., No. 6, Manchester, NH, US, 8 pp.

Izatt, Joseph A. et al., "Optical Coherence Tomography for Biodynamics," pp. 41–65.

Kozlov, V.A. et al. "In–Line Singlemode Fibre Based on LiF:$F_2$–crystals," Electronic Letters, vol. 31, No. 24, p. 2104 (Nov. 23, 1995).

(List continued on next page.)

Primary Examiner—Frank G. Font
Assistant Examiner—Roy M. Punnoose
(74) Attorney, Agent, or Firm—Heslin & Rothenberg, P.C.

(57) ABSTRACT

An optical channel waveguide amplifier and fabrication process are provided for an optical communications system. The amplifier employs an optical waveguide having a core of active material exhibiting optical fluorescence when stimulated. The core has a propagation axis extending from an input surface to an output surface. The input surface intersects the propagation axis at a non-orthogonal angle (e.g., 45°). A cladding at least partially surrounds the core, and a coating is provided over the angled input surface of the core. The coating is anti-reflective of the optical signal, input at a predetermined signal wavelength, and is highly reflective of the pump, input at a predetermined pump wavelength. A prism, index-matched to the core, is secured to the angled face of the optical waveguide so that the input signal may be focused into the core through the prism and the coating collinearly with the axis of propagation, while the pump is reflected into the core off the coating at the angled input surface from an angle to the axis of propagation. The optical signal undergoes amplification within the core by stimulated emissions of the active material driven by the pump.

45 Claims, 3 Drawing Sheets

U.S. PATENT DOCUMENTS

| | | | |
|---|---|---|---|
| 4,515,431 | 5/1985 | Shaw et al. | 350/96.15 |
| 4,603,940 | 8/1986 | Shaw et al. | 350/96.15 |
| 4,712,075 | 12/1987 | Snitzer | 330/4.3 |
| 4,742,307 | 5/1988 | Thylén | 330/4.3 |
| 4,867,518 | 9/1989 | Stamnitz et al. | 350/96.15 |
| 4,895,422 | 1/1990 | Rand et al. | 350/96.15 |
| 5,005,175 | 4/1991 | Desurvire et al. | 372/6 |
| 5,037,181 | 8/1991 | Byer et al. | 385/144 |
| 5,045,397 | 9/1991 | Jensen | 428/429 |
| 5,064,265 | 11/1991 | Khanarian et al. | 385/130 |
| 5,201,977 | 4/1993 | Aoshima | 156/153 |
| 5,274,495 | 12/1993 | Shirasaki | 359/330 |
| 5,349,600 | 9/1994 | Shinbori et al. | 372/92 |
| 5,396,362 | 3/1995 | Yakymyshyn et al. | 359/245 |
| 5,441,803 | 8/1995 | Meissner | 428/220 |
| 5,479,542 | 12/1995 | Krivoshlykov | 385/30 |
| 5,543,960 | 8/1996 | Carrig et al. | 359/326 |
| 5,563,899 | 10/1996 | Meissner et al. | 372/39 |
| 5,717,517 | 2/1998 | Alfano et al. | 359/342 |
| 5,815,309 | 9/1998 | Lawrence et al. | 359/333 |
| 5,846,638 | 12/1998 | Meissner | 428/220 |
| 5,892,857 | 4/1999 | McCallion | 385/1 |
| 5,953,477 * | 9/1999 | Wach et al. | 385/115 |
| 6,052,220 * | 4/2000 | Lawrence et al. | 385/30 |
| 6,141,475 * | 10/2000 | Lawrence et al. | 385/123 |

OTHER PUBLICATIONS

Li, Cheng Chung et al., "Er–Doped Glass Ridge–Waveguide Amplifiers Fabricated with a Collimated Sputter Deposition Technique," *IEEE Photonics Technology Letters*, vol. 9, No. 9, pp. 1223–1225 (Sep. 1997).

Stewart, Kevin R. "Organic Crystals Give Optoelectronics a Boost", Photonics Spectra, pp. 104–108, Jul. 1994

Bradley, D. "Plastics That Play on Lights", Science, vol. 261, pp. 1272 & 1273, Sep. 1993.

K. Thragarajan et al., "Proton–exchanged periodically segmented waveguides in LiNbO3", Optics Letters, vol. 19, No. 12, Jun. 15, 1994, pp. 880–882.

M.L. Bortz et al., "Increased asseptance bandwidth for quasi–phasematched second harmonic generation LiNbO3 waveguides", IEEE, Oct. 28, 1993, (2 p p.).

S. Helmfrid et al., "Optical Parametric Amplification of a 1.54– m Single–Mode DFB Laser in a Ti:LiNbO3 Waveguide", Journal of Lightwave Technology, vol. 11, No. 9, Sep. 1993, pp. 1459–1469.

R.A. Baumgartner et al., "Optical Parametric Amplification", IEEE Journal of Quantum Electronics, vol. QE–15, No. 6, Jun. 1979, pp. 432–444.

Marder et al., "Nonlinear Optical Polymers: Discovery to Market in 10 Years?", Science, vol. 263, pp. 1706 & 1707, Mar. 1994.

McCallion et al., "Investigation of Optical Fibre Switch Using Electro–Optic Interlays," Dec. 1991.

Millar et al., "Exposed–Core Single–Mode–Fiber Channel–Dropping Fliter Using a High–Index Overlay Waveguide", Optical Society of America, vol. 12, No. 4, pp. 284–286, Apr. 1987.

Fawcett et al., "In–Line Fibre–Optic Intensity Modulator Using Electro–Optic Polymer", Electronic Letters, vol. 29, No. 11, pp. 985 & 986, May 1992.

Creaney et al., "Continuous–Fiber Modulator with High–Bandwidth Coplanar Strip Electrodes", IEEE Photonics Technology Letters, vol. 8, No. 3, pp. 355–357, Mar. 1996.

Panajoatov, Krassimir P., "Evanescent Field Coupling Between a Single–Mode Fiber and a Planar Waveguide with Absorption or Gain", Optical Society of America, vol. 13, No. 11, pp. 2468–2476, Nov. 1996.

S.J. Field et al., "Ion–Implanted Nd:GGG channel waveguide laser," Opt. Lett. 17, 52 (1992).

I. Chartier et al., Growth and low–threshold laser oscillation of an expitaxially grown Nd:YAG waveguide, Opt Lett., 17 810 (1992).

A.N. Sanford et al., "Nd:LiTaO3 waveguide laser," Opt. Lett., 17, 1578 (1992).

U. Griebner et al., "Efficient laser operation with nearly diffraction–limited output from a diode–pumped heavily Nd–doped multimode fiber," Opt. Lett. 21, 266 (1996).

P. Rogin and J. Hulliger, "Epitaxial Nd:YLF linear waveguide laser," Opt. Lett., 22, 1701 (1997).

* cited by examiner

OPTICAL CHANNEL WAVEGUIDE AMPLIFIER

CROSS-REFERENCE TO RELATED APPLICATIONS

This application relates to the following commonly assigned patent applications:

U.S. patent application Ser. No. 09/121,455, filed Jul. 23, 1998, by McCallion et al., and entitled "METHOD FOR FABRICATING AN OPTICAL WAVEGUIDE."

U.S. patent application Ser. No. 09/121,454, filed Jul. 23, 1998, by Lawrence et al., and entitled "OPTICAL WAVEGUIDE WITH DISSIMILAR CORE AND CLADDING MATERIALS, AND LIGHT EMITTING DEVICE EMPLOYING THE SAME" now U.S. Pat. No. 6,141,475.

These applications are hereby incorporated herein by reference in their entirety.

TECHNICAL FIELD

The present invention relates in general to an optical amplifier employing the principles of amplification by stimulated emission, and more particularly, to an optical channel waveguide for use in a fiber optic system to amplify an attenuated optical signal employing stimulated emissions.

BACKGROUND OF THE INVENTION

There continues to be considerable interest in producing optical amplifiers for amplifying weak optical signals in both local and trunk optical networks. The high data rates and low optical attenuation associated with fiber optic lengths are well-established and continue to become more appreciated as fiber lengths become more economical compared with electrical coaxial cable alternatives. In spite of the relatively low magnitude of optical signal loss during transmission, the intrinsic linear attenuation law of lightwave energy in optical fibers necessitates optical repeater nodes to amplify and/or regenerate the digital optical bitstreams or analog signals in long-haul terrestrial and undersea communication systems. Typically, unrepeated distances extend from 30 to 70 kilometers in length, depending upon the fiber loss at the selected transmission wavelength, which is ordinarily 1.31 or 1.55 microns, respectively.

One non-invasive approach to amplifying an optical signal in a fiber optic is presented in U.S. Pat. Nos. 4,955,025 and 5,005,175 entitled, "Fiber-Optic Lasers and Amplifiers" and "Erbium-Doped Fiber Amplifier," respectively. In these patents, a doped optical fiber is transversely coupled to a pump so that a weak optical input signal at a specific wavelength within the rare-earth gain profile experiences a desired amplification. Pumping is effected by a separate laser or lamp which emits photons of appropriate energy, i.e., higher than that of the signal wavelength. Electrons in the doped fiber are excited from the ground state to one or more pump bands. The electrons then decay an amount corresponding to the wavelength at which the device operates. When a photon at the laser wavelength interacts with an excited atom, stimulated emission occurs. An output photon can thus originate from either previous spontaneous emission, stimulated emission, or an input signal.

Since erbium-doped amplifiers only operate at a specific wavelength, i.e., 1.53 $\mu$m–1.55 $\mu$m, other approaches to non-invasive optical amplifiers, operable for example at 1310 nm, are under investigation using semiconductor materials and variations of the rare-earth doped fibers. To date, however, serious problems have plagued development of these devices. Namely, semiconductor amplifiers have been unable to provide sufficient gain, without still having significant noise problems. Rare-earth doped fiber amplifiers have also suffered from a variety of problems.

For example, neodymium (Nd) doped fibers have problems in obtaining sufficient gain at 1310 nm while maintaining the high quality, low-loss characteristics of the optical fiber. Specifically, excited state absorption in silica-based, Nd-doped fiber push the spectral range of any reasonable gain out to beyond 1330 nm resulting in substantial reduction in the usable spectrum. Further, using non-silica fibers, such as fluorozirconate or phosphate glass fibers, poses significant fabrication problems and raises questions of environmental stability. The alternative to neodymium in the 1300 nm window in optical fiber is Praseodymium (Pr), which also has had its share of difficulties. As with Nd-doped silica fiber, Pr-doped fiber requires a non-silica fiber host to achieve sufficient gain to be usable. In fact, to date only fluorozirconate (ZBLAN) fiber has proven capable of generating sufficient gain. Unfortunately, Pr-doped fibers, ZBLAN or otherwise, also require pumping at a wavelength of 1020 nm, which is not a standard laser transition. Thus, there have been significant problems generating the needed power levels at these odd wavelengths.

In view of the above, there remains a need in the optical communications art for an improved optical amplifier and amplification approach providing amplification characteristics commensurate with those attained by erbium-doped fibers at 1550 nm, but operable at any optical wavelength employed within an optical fiber, such as 1310 nm. The present invention provides an optical amplifier architecture and amplification process which addresses this need.

DISCLOSURE OF THE INVENTION

Briefly described, the present invention comprises in one aspect an optical waveguide which includes a core of active material exhibiting optical fluorescence when stimulated. The core has a propagation axis extending from an input surface to an output surface thereof. The input surface intersects the propagation axis at a non-orthogonal angle, and a cladding at least partially surrounds the core. The input surface of the core allows both an optical signal and a pump to be concurrently input to the core, where the optical signal undergoes amplification by stimulated emissions of the active material driven by the pump. An amplified optical signal is ultimately output through the output surface of the core.

In another aspect, the present invention comprises an optical amplifier which includes an optical waveguide having a first end and a second end. The optical waveguide includes a core of active material exhibiting optical fluorescence when stimulated. The core has a propagation axis extending from an input surface at the first end to an output surface at the second end of the optical waveguide. The input surface intersects the propagation axis at a non-orthogonal angle, and a cladding at least partially surrounds the core. The input surface allows both an optical signal and a pump to be concurrently input to the core, where the optical signal undergoes amplification by stimulated emissions of the active material driven by the pump. The optical amplifier further includes a first coating disposed over the first end of the optical waveguide. The first coating is anti-reflective of the optical signal at a predetermined signal wavelength and is reflective of the pump at a predetermined pump wavelength. Signal delivery optics are provided adjacent to the first end of the optical waveguide for focusing the optical signal through the input surface into the core of the optical waveguide; and pump deliver optics are provided near the first end of the optical waveguide and at an angle to the propagation axis of the core. The pump delivery optics focus the pump for reflection off the first coating at the input surface into the core.

In a further aspect, a method is provided for amplifying an optical signal. The method includes: providing an optical waveguide having a core of active material exhibiting optical fluorescence when stimulated, the core having a propagation axis extending from an input surface to an output surface, the input surface intersecting the propagation axis at a non-orthogonal angle, and a first coating disposed over the input surface of the core, the first coating being anti-reflective of the optical signal and reflective of the pump; inputting the optical signal into the core through the first coating and the input surface; and inputting the pump to the core by reflecting the pump off the first coating at the input surface, wherein both the optical signal and the pump are concurrently input to the core, and the optical signal undergoes amplification by stimulated emissions of the active material driven by the pump.

In a still further aspect, the present invention comprises a method of fabricating an optical waveguide. This method includes: forming an optical waveguide having a core comprising a first material with a first index of refraction and cladding at least partially surrounding the core, the cladding having a second index of refraction, wherein the second index of refraction is lower than the first index of refraction, and wherein the first material comprises an active material which exhibits optical fluorescence when stimulated, and the core has an input surface at a first end of the optical waveguide and an output surface at a second end of the optical waveguide; polishing the first end of the optical waveguide until the input surface of the core is at a non-orthogonal angle to a propagation axis of the core; and applying a first coating over the first end of the optical waveguide, the first coating being anti-reflective of an optical signal to be input to the core and reflective of a pump to be input to the core from an angle to the propagation axis.

To summarize, a novel channel waveguide structure is described herein which offers several advantages over other amplification processes. Because the channel waveguide architecture presented does not require a fiber-like geometry, a variety of materials which are not normally used in fiber applications can be taken advantage of, for example, Neodymium-doped Yttrium Aluminum Garnet (Nd:YAG). In fact, most crystalline and other solid-state materials which are not amenable to fiber formation can be used for amplification, such as Nd-doped phosphate glass. Specifically, for amplification in the 1300 nm region of the spectrum, Nd-doped nonsilica glasses show promise; and, unlike the 1020 nm pumps for Pr-doped amplifiers, high power 808 nm laser diodes can be used as pumps for the Nd-doped systems. As is well-known, 808 nm laser diodes comprise a mature, well-developed laser technology. This architecture is also well suited for amplification to alternative wavelengths as well, for example, at 980 nm to generate extremely high-power pump sources for traditional erbium-doped fiber amplifiers, or other non-traditional wavelengths for short-haul communications and sensor applications.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Generally stated, a novel channel waveguide architecture and optical amplifier employing the same are presented wherein stimulated emission is employed to amplify signals in a fiber-optic system. The unique waveguide architecture allows both the optical signal and a high-power laser pump to be efficiently coupled into the core concurrently for amplification of the optical signal by stimulated emissions.

Figure 1:
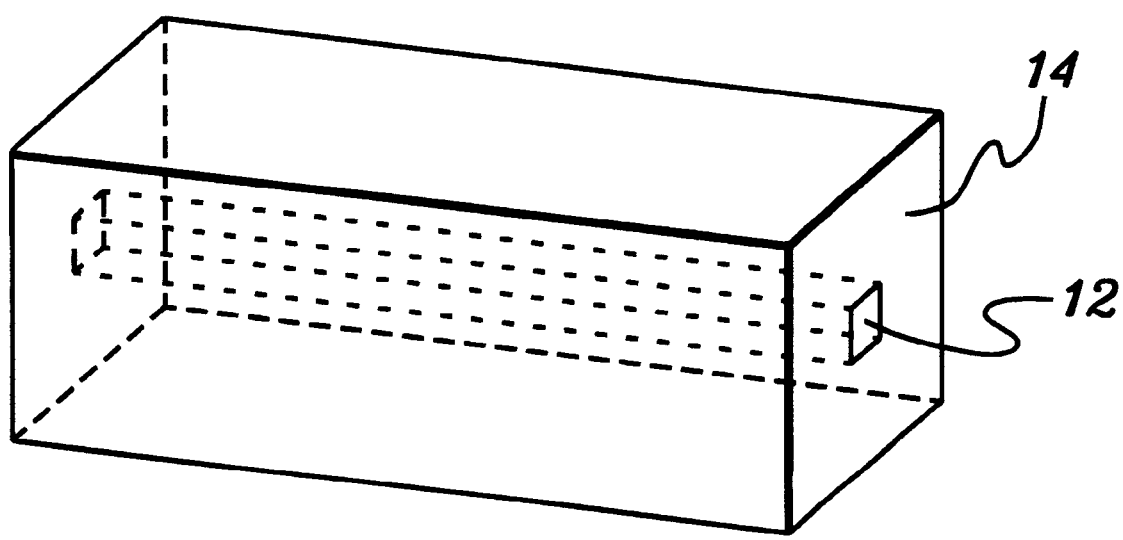
FIG. 1 is a perspective view of one embodiment of an intermediate optical channel waveguide structure in accordance with the present invention.

FIG. 1 depicts an optical channel waveguide 10, which in one embodiment may be constructed employing the fabrication process described in the above-incorporated U.S. patent applications. This optical waveguide 10 includes a core 12 of active material surrounded by a cladding 14 comprising, for example, a dissimilar material than the core. As used herein, the phrase "dissimilar material" means that the material comprising the cladding and the material comprising the core are structurally and/or chemically distinct having been separately fabricated as physically different materials and brought together during the assembly process for the optical waveguide 10.

Briefly summarized, in one embodiment fabrication of optical waveguide 10 is a multi-step process using precision lapping and polishing techniques to mechanically thin the selected optical material (i.e., core) to the desired thickness in both the lateral and vertical directions. Optical adhesives are used to bond the channel waveguide to the surrounding support/cladding media. The fabrication process may include preparing a flat, optical surface on both the chosen optical material (i.e., core) and the chosen support substrate (i.e., cladding). Fused silica may be used as a support substrate due to its ease of processing and low refractive index. In the case of very thin glue layers (<1 $\mu$m), for efficient waveguiding action, the channel must be surrounded by a lower refractive index material. Obviously, the refractive index of the selected optical material (core) determines the index range for the cladding or support regions. Other requirements of the surrounding medium are processing compatibility with the optical material, availability of the material, and adhesive bonding affinity. Fused silica meets these requirements, although a range of optical glasses are also ideal.

In the case of thick glue layers, the refractive index of the glue provides the cladding index and influences the waveguide properties. In this situation, the support substrates can be selected for their processing qualities irrespective of the refractive index. However, particular issues such as edge breakage and differential polishing rates between the glue and core/cladding materials must be considered in selecting appropriate glue thicknesses. If desired, parallel processing of samples can be performed at each step of the process flow.

In general, lapping and polishing stages use water-based slurries with varying particle sizes and types for precision material removal. Waveguide dimensions are monitored using a micrometer gauge and processing is terminated at the desired value. Accuracy to 1 µm can be achieved in this manner. The use of high precision polishing jigs allows exceptional flatness and parallelism over the waveguide surface area.

Typical dimensions may be in the range of 2–5 mm×2–5 mm cross-section with channel lengths of 5–20 mm, or longer. This size allows easy handling and mechanical fixturing of the chips during processing and optical testing. The end faces of the chips are optically polished to allow efficient optical power launching into and from the channel waveguide.

For a more complete discussion of the above-summarized optical waveguide fabrication process for the structure of FIG. 1, reference the above-incorporated applications. One result of this particular process is that the core or active material comprises a "dissimilar material" from the cladding (which may either be considered as the support material itself or the support material in combination with the optical adhesive, or the optical adhesive itself, if sufficiently thick).

By way of specific example, the structure of FIG. 1 might comprise an optical waveguide having an Nd:glass core 30 µm×30 µm surrounded by a fused silica cladding constructed as summarized above via lapping and polishing techniques and using a UV-cured optical adhesive. For example, glue type UVOA-45 manufactured by Armbruster Associates, Inc. of Summit, N.J. may be employed. This particular glue type comprises an ultra-violet cured, low-viscosity, optical adhesive.

Table I presents various waveguide examples in accordance with the present invention. Note that these combinations are provided by way of example only, and there are countless additional waveguide formations which are possible.

TABLE I

| Cladding material | Core material |
|---|---|
| Fused silica(n = 1.45) | Nd-doped YAG(n = 1.81) |
| Soda-lime glass(n = 1.5) | Nd-doped YAG(n = 1.81) |
| Fused silica(n = 1.45) | Nd-doped phosphate glass (n = 1.56) |
| Fused silica(n = 1.45) | Cr-doped Forsterite(n = 1.56) |
| Fused silica(n = 1.45) | SFL6 doped glass(n = 1.76) |
| Magnesium fluoride(n = 1.38) | Lithium niobate(n = 2.2) |
| Fused silica(n = 1.45) | Lithium niobate(n = 2.2) |
| Soda-lime glass(n = 1.5) | Cr-doped YAG(n = 1.8) |

To summarize, the core of the waveguide structure 10 is an active material that can be optically pumped at one wavelength and consequently emit, and thereby amplify, light at a desired wavelength. The cladding 14 is an inactive material which has a lower index of refraction than the core 12. Also, note that the above-summarized process for fabricating the structure of FIG. 1 is provided by way of example only. Additional fabrication approaches will be apparent to one skilled in the art. For instance, core 12 and cladding 14 could alternatively be fabricated of similar materials, as is known in the art.

Figure 2:
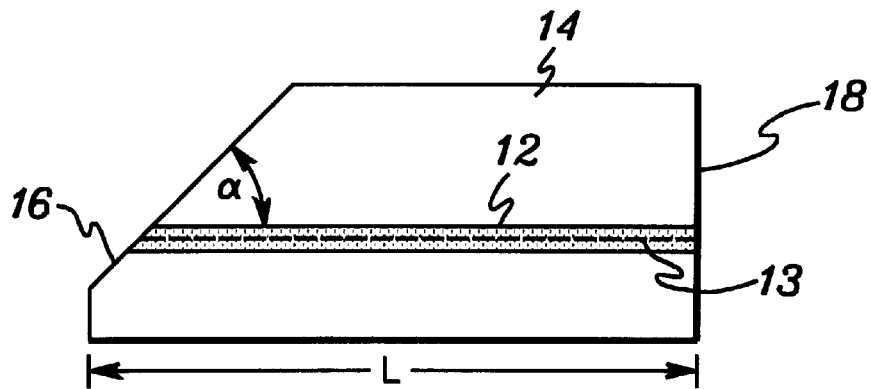
FIG. 2 is an elevational view of the optical channel waveguide structure of FIG. 1 wherein a first end has been polished with an input surface of core 12 at a 45° angle to a propagation axis thereof.

After obtaining the waveguide architecture of FIG. 1, a first end of structure 10 is polished at a non-orthogonal angle α, such as a 45° angle, to the propagation axis 13 of core 12, while the second end 18 of structure 10 is polished normal to the waveguide core. Note that although preferably comprising a 45° angle in the example described herein, the angled first end 16 may be any angle provided it is other than normal to the waveguide core 12. A range of 40° to 50° is preferred in one example. Also, as shown in FIG. 2, polishing to create the angle α at first end 16 of the waveguide structure 10 need only be such as to define the angle across the input surface of core 12. For ease of handling and to prevent breakage, the angled polished portion of end 16 may comprise less than the entire first end.

Figure 3:
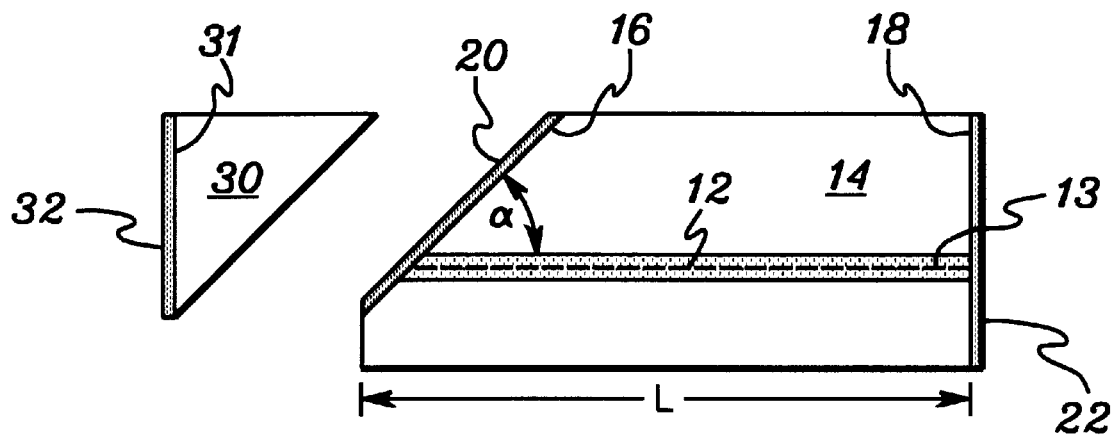
FIG. 3 is an elevational view of the optical channel waveguide structure of FIG. 2 wherein a first optical coating has been added to the angled portion of the first end of the waveguide, and a second optical coating has been added to a second end of the waveguide, and also showing a prism 30 to be secured to the angled portion of the first end of the waveguide.

As shown in FIG. 3, the polished ends 16 & 18 of the waveguide structure 10 are next coated. The 45° face 16 is provided with coating 20 architected to reflect light at the pump wavelength and pass light at the signal wavelength. This allows pump light to be input into the waveguide by reflecting it off the inner surface of the coating at the angled input surface, while the optical signal is directly focused into the waveguide core through coating 20 at the same angled end face 16. Thus, coating 20 on angled face 16 is preferably highly reflective at the pump wavelength and is anti-reflective at the signal wavelength. The flat end 18 of the waveguide structure is coated 22 anti-reflective to mitigate reflections at the signal wavelength (and may be coated to reflect light at the pump wavelength), thereby minimizing any possible cavity effects.

A prism 30 having an index of refraction matching the index of refraction of waveguide core 12 is preferably configured for adhesive bonding to the angled portion of end face 16. Prism 30 will be bonded to end face 16 over coating 20 on the angled portion. The outside face 31 of prism 30 has a coating 32 similar to coating 22 on the second end of the waveguide structure, i.e., coating 32 is antireflective at the signal wavelength.

Figure 4:
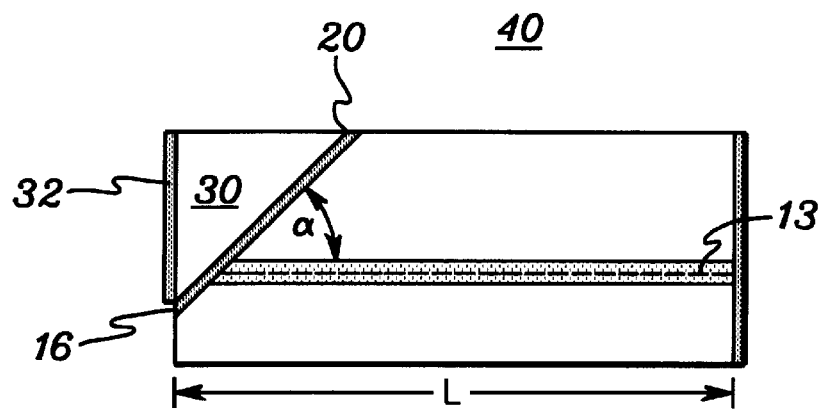
FIG. 4 is an elevational view of the optical channel waveguide structure of FIG. 3 wherein prism 30 has been adhered to the angled portion of the first end of the waveguide, and the prism is shown to include an optical coating on an exposed surface thereof normal to the propagation axis 13 within the core.

FIG. 4 depicts the completed waveguide assembly 40 in accordance with the present invention, wherein prism 30 has been bonded to the angled end face 16. The core index-matched prism 30 allows the optical signal to be input into the waveguide core coaxial or collinear to the waveguide propagation axis 13. One skilled in the art will understand that if the index of refraction of prism 30 is other than matching to the waveguide core 12, then the optical signal will need to be input at an angle relative to the waveguide core, with the angle being determined by the particular index of refraction of the prism. Although the present invention encompasses this possibility, as well as the possibility that the angled end surface 16 may be other than a 45° angle, matching the index of refraction of prism 30 to that of waveguide core 12, as well as providing the angled surface at 45° to the core axis are believed advantageous in that they simplify alignment of the signal delivery optics and pump delivery optics for optimum focusing of the signal and pump, respectively, into the waveguide core.

Figure 5:
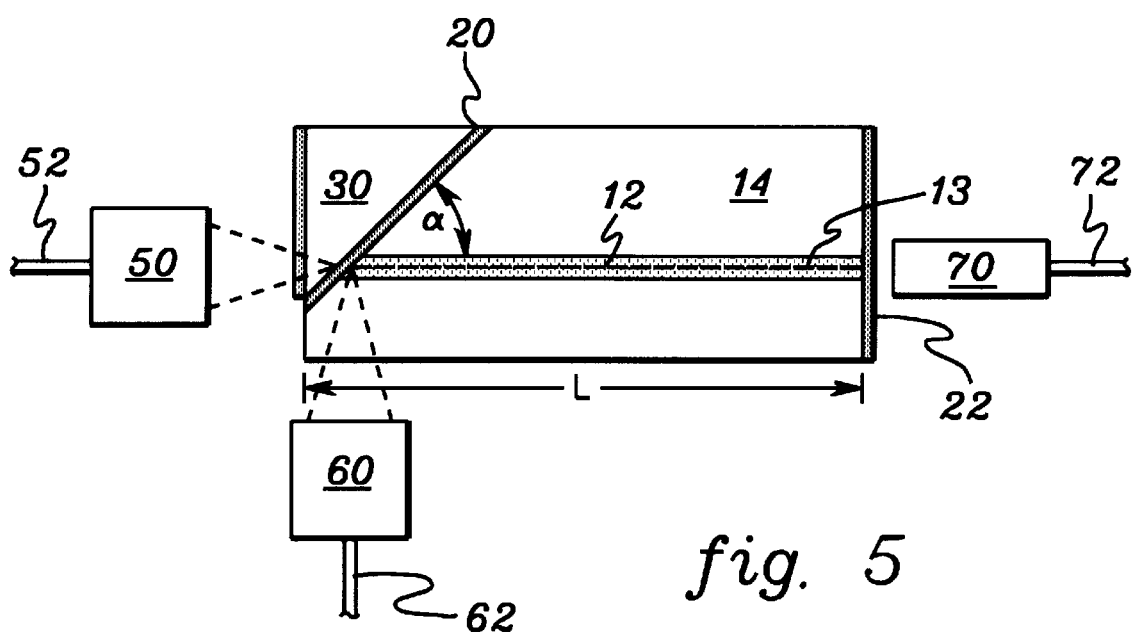
FIG. 5 is a schematic of one embodiment of an optical amplifier in accordance with the present invention employing the optical channel waveguide of FIG. 4.

To summarize, an optical channel waveguide amplifier in accordance with this invention uses the process of stimulated emission to amplify signals in a fiber-optic system employing a waveguide assembly, such as assembly 40 of FIG. 4. The waveguide assembly is pumped by a high-powered diode laser to provide the gain which is then used to amplify an injected optical signal. The architecture of the system consists of a channel waveguide fabricated from an active material which has end faces that have been appropriately formed as described above to provide signal and pump injection and amplified signal pick-up. The system also includes optics for delivering the input signal from a single-mode optical fiber, optics for delivering the pump from a single-mode or multi-mode optical fiber, and a means for collecting the amplified output signal into a single-mode optical fiber. The general structure of one embodiment of an optical channel waveguide amplifier in accordance with the present invention is shown in FIG. 5.

The optical signal is delivered to the waveguide core 12 through prism 30 using an appropriate set of signal delivery optics 50. The signal delivery optics 50 accept the optical beam expanding out of, for example, a single-mode optical fiber 52 and re-focus the beam to converge within the optical waveguide core 12. The overall optical assembly must have a working distance long enough to focus through the prism and provide a minimum beam waist at the input to the waveguide core. In addition, it must re-image the beam such that it is equal to or smaller than the waveguide core dimensions for maximum efficiency.

The pump is delivered to the waveguide core 12 in a manner similar to the optical signal. A set of optics 60 is used to re-focus the pump beam from a single-mode or multi-mode optical fiber 62 into the waveguide core. Unlike the optical signal delivery mechanism, however, the pump beam is delivered to the waveguide by reflecting the beam off the inner surface of the 45° coated face into the guide. Thus, the pump delivery optics must also have a focal length which is long enough to place the beam waist at the input to the waveguide. Furthermore, it must re-focus the beam to a size that can fit within the waveguide dimensions for maximum pump efficiency.

At the output end, the amplified signal at the desired wavelength is recovered from the waveguide and placed back into, for example, a single-mode optical fiber 72. This recovery unit 70 has the most flexibility in that insertion loss can be traded off against simplicity. For example, for a single-mode optical fiber, the simplest pick-up assembly is the bare fiber itself. However, because the waveguide dimensions can be vastly different than the optical fiber dimensions, the insertion loss may be very large. On the other hand, because the input assembly 50, 60 can be designed for fundamental mode excitation, the low numerical aperture (NA) of the output allows for an optical assembly that can be very efficient, with insertion losses of 1 dB or less. Regardless of the approach, the purpose of the pick-up assembly 70 is to transfer the signal output from the waveguide amplifier into the optical fiber of the system for continued transmission.

As an example of a complete amplifier device in accordance with the present invention, the waveguide may be composed of a Neodymium-doped Yttrium Aluminum Garnet (Nd:YAG) 10 mm long, 30 $\mu$m×30 $\mu$m core bonded to fused silica cladding using UVOA-45 adhesive available from Armbruster Associates, Inc. of Summit, N.J. Nd:YAG is used as the core to achieve narrowband amplification at 1319 nm. The 45° end face is coated with a dielectric stack that provides high reflectance (HR) at 808 nm, which is the pump wavelength, and is nominally transparent (<2% reflection) at both 1064 nm and 1319 nm. This coating can be obtained from Cascade Optical Coatings, Inc. of Santa Ana, Calif. Bonded onto the 45° end face is a prism formed from SFL-6 glass (available from Schott Technologies Inc. of Duryea, Pa.), which has an index nearly matched to the Nd:YAG core. Both ends of the unit are coated with a dielectric stack that is anti-reflective (AR) at both 1064 nm and 1319 nm (which can be obtained from Cascade Optical Coatings, Inc.). The signal is delivered from single-mode optical communication fiber (type SMF-28 available from Corning, Inc. of Corning, N.Y.) to the waveguide using a matched pair of aspheric lenses with a focal length of 11.0 mm and a NA of 0.25 (Model number C220MP-C from Thorlabs, Inc. of Newton, N.J.). The pump laser diode is a 0.75 W 808 nm semiconductor laser (type OPC-A001-808-FC/100 from Opto Power Corp. of Tucson, Ariz.) coupled to a 100 $\mu$m core single-mode or multi-mode fiber with a NA of 0.22. The pump light is delivered using a mismatched pair of aspheric lenses; the first lens collects the light out of the pump delivery fiber and the second lens focuses the light into the waveguide. The first lens has a focal length of 11.0 mm and a NA of 0.25 (Model no. C220TM-B from Thorlabs, Inc.), and the second lens has a focal length of 3.1 mm and a NA of 0.68 (Model no. C330TM-B from Thorlabs, Inc.). Finally, the amplified signal is recovered from the waveguide using bare single-mode fiber (type SMF-28 from Corning, Inc.) bonded into a zirconium ferrule and polished.

As noted, certain implementations of an amplifier in accordance with the present invention may be fabricated from Nd:YAG channel waveguides. As such, these units provide high gain and high saturated output powers for a single wavelength, namely 1319 nm. The single channel, high-performance nature of these amplifiers along with their operation at 1319 nm makes them ideally suited for applications in cable television (CATV) distribution.

As an alternative, the channel waveguide could be fabricated from a variety of Nd-doped glasses. Such units would provide moderate gains and saturated output powers over a broad spectral range (greater than 20 nm). Consequently, these units have applications in communications systems employing multiple channels at various wavelengths, such as wavelength division multiplexed (WDM) systems in the 1300 nm spectral region.

As a further enhancement, lessons taught by Griebner et al. in an article entitled "Efficient Laser Operation With Nearly Defraction-Limited Output From A Diode-Pumped Heavily Nd-Doped Multinode Fiber," Optics Letters, vol. 21, p. 266 (1996) (which is hereby incorporated herein by reference), could be applied to an amplifier in accordance with the present invention. This article describes a process for exciting a single-mode in a multi-mode core. By using an appropriate set of signal delivery optics, the fundamental mode of a multi-mode waveguide can be excited, which allows good overlap between the pump, also being delivered into a fundamental mode, and the signal. Because the optical signal and pump are both in the fundamental mode, they would overlap well, thereby providing improved signal recovery at the output of the waveguide.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. An optical waveguide comprising:
   a core of active material exhibiting optical fluorescence when stimulated, said core having a propagation axis extending from an input surface to an output surface, said input surface intersecting said propagation axis at a non-orthogonal angle;

a cladding at least partially surrounding said core; and wherein said input surface allows both an optical signal and a pump to be combined thereat and concurrently input to said core where said optical signal undergoes amplification by stimulated emissions of said active material driven by said pump.

2. The optical waveguide of claim 1, wherein said active material comprises a first material having a first index of refraction, and wherein said cladding comprises a second material having a second index of refraction, said second index of refraction being lower than said first index of refraction.

3. The optical waveguide of claim 2, wherein said first material and said second material comprise dissimilar materials.

4. The optical waveguide of claim 2, further comprising a prism attached to said angled input surface of said core, said prism allowing inputting of said optical signal collinear with said propagation axis of said core, said prism having an index of refraction similar to said first index of refraction of said active material comprising said core.

5. The optical waveguide of claim 4, further in combination with signal delivery optics in optical proximity to said angled input surface of said core with said prism attached thereto, said signal delivery optics being adapted to focus said optical signal into said core through said prism and said angled input surface.

6. The optical waveguide of claim 1, wherein said non-orthogonal angle comprises approximately a 45° angle.

7. The optical waveguide of claim 1, wherein said optical waveguide comprises a channel waveguide.

8. The optical waveguide of claim 7, wherein said channel waveguide comprises one of a crystal, a rare-earth doped glass, a rare-earth based deposited film, a polymer, and an optically/electrically pumped semiconductor.

9. The optical waveguide of claim 8, wherein said channel waveguide comprises neodymium-doped yttrium aluminum garnet.

10. The optical waveguide of claim 1, wherein said input surface has a first coating thereon, said first coating being anti-reflective of said optical signal for input of said optical signal into said core through said first coating, and reflective of said pump for reflection of said pump into said core from an angle to said propagation axis.

11. The optical waveguide of claim 1, further comprising a first coating disposed over said input surface of said core at a first end of said optical waveguide and a second coating disposed over said output surface of said core at a second end of said optical waveguide, wherein said first coating is anti-reflective of said optical signal at a predetermined signal wavelength and reflective said pump at a predetermined pump wavelength, and wherein said second coating is anti-reflective of an amplified optical signal to be output from said optical waveguide.

12. The optical waveguide of claim 11, wherein said angled input surface comprises an approximately 45° angled surface to said propagation axis, and wherein said output surface is approximately orthogonal to said propagation axis.

13. The optical waveguide of claim 12, further comprising a prism adhered to said first coating disposed over said input surface, said prism having an index of refraction similar to an index of refraction of said active material comprising said core for allowing inputting of said optical signal collinear with said propagation axis of said core.

14. An optical amplifier comprising:
an optical waveguide having a first end and a second end, and including:
  a core of active material exhibiting optical fluorescence when stimulated, said core having a propagation axis extending from an input surface at said first end to an output surface at said second end of said optical waveguide, said input surface intersecting said propagation axis at an non-orthogonal angle;
  a cladding at least partially surrounding said core;
  wherein said input surface allows both an optical signal and a pump to be concurrently input to said core where said optical signal undergoes amplification by stimulated emissions of said active material driven by said pump;
a first coating disposed over said angled input surface of said core at said first end of said optical waveguide, said first coating being anti-reflective of said optical signal at a predetermined signal wavelength and reflective of said pump at a predetermined pump wavelength;
signal delivery optics disposed in optical proximity to said first end of said optical waveguide for focusing said optical signal into said core through said first coating over said input surface of said optical waveguide; and
pump delivery optics disposed near said first end of said optical waveguide and at an angle to said propagation axis of said core, said pump delivery optics focusing said pump for reflection off said first coating at said input surface of said core wherein said pump enters said core from an angle to said propagation axis.

15. The optical amplifier of claim 14, further comprising signal recovery optics disposed in optical proximity to said second end of said optical waveguide for recovering an amplified optical signal emitted from said optical waveguide.

16. The optical amplifier of claim 15, wherein said optical signal is fed to said signal delivery optics via a single mode optical fiber, said pump is fed to said pump delivery optics via one of a single-mode or multi-mode optical fiber, and said signal recovery optics provide said amplified optical signal emitted from said optical waveguide to a single mode optical fiber.

17. The optical amplifier of claim 14, wherein said optical waveguide comprises a channel waveguide comprising one of a crystal, a rare-earth doped glass, a rare-earth based deposited film, a polymer, and an optically/electrically pumped semiconductor.

18. The optical amplifier of claim 17, wherein said channel waveguide comprises a neodymium-doped material, and wherein said predetermined signal wavelength is in a range of 1290–1330 nm, and said predetermined pump wavelength is approximately 808 nm.

19. The optical amplifier of claim 14, further comprising a prism attached to said optical waveguide at said first end of said optical waveguide over said first coating on said angled input surface of said core, said prism having an index of refraction similar to an index of refraction of said active material comprising said core, and wherein said signal delivery optics comprise optics adapted to focus said optical signal through said prism and said first coating into said core of said optical waveguide collinear with said propagation axis.

20. The optical amplifier of claim 14, further comprising a second coating disposed over said second end of said optical waveguide, said second coating being anti-reflective of an amplified optical signal emitted from said optical waveguide through said output surface of said core.

21. The optical amplifier of claim 14, wherein said non-orthogonal angle comprises approximately a 45° angle, and said optical waveguide comprises a channel waveguide.

22. A method for amplifying an optical signal, said method comprising:
    providing an optical waveguide, said optical waveguide including a core of active material exhibiting optical fluorescence when stimulated, said core having a propagation axis extending from an input surface to an output surface, said input surface intersecting said propagation axis at a non-orthogonal angle, and a first coating disposed over said input surface of said core, said first coating being antireflective of said optical signal and reflective of said pump;
    inputting said optical signal into said core through said first coating and said input surface; and
    inputting said pump into said core by reflecting said pump off said first coating at said input surface so that said pump enters said core from an angle to said propagation axis, wherein both said optical signal and said pump are concurrently input to said core, and said optical signal undergoes amplification by stimulated emissions of said active material driven by said pump.

23. The method of claim 22, wherein said inputting of said optical signal comprises focusing said optical signal into said core through said first coating and said input surface, and wherein said inputting of said pump comprises focusing said pump into said core by reflecting said pump off said first coating at said input surface of said core.

24. The method of claim 22, wherein said core comprises a multi-mode channel, and wherein said inputting of said optical signal comprises delivering said optical signal into said core at a fundamental mode of said multi-mode channel, and said inputting of said pump comprises delivering said pump into said core at said fundamental mode of said multi-mode channel.

25. The method of claim 22, further comprising providing a prism disposed over said first coating at said input surface of said core, and wherein said inputting of said optical signal comprises inputting said optical signal into said core through said prism, said first coating and said input surface in a direction collinear with said propagation axis of said core.

26. The method of claim 22, further comprising outputting an amplified optical signal at said second end of said optical waveguide, and collecting said amplified optical signal output from said optical waveguide for transmission within a single mode fiber optic.

27. The optical waveguide of claim 3, wherein said first material and said second material are structurally and/or chemically distinct having been separately fabricated as physically different materials and brought together during waveguide assembly.

28. The optical waveguide of claim 27, wherein said first and second material are adhesively attached in said waveguide.

29. The optical waveguide of claim 8, wherein said core comprises a doped phosphate glass.

30. The optical waveguide of claim 1, in combination with a fiber optic communications amplifier.

31. The combination of claim 30, wherein said core comprises a multi-mode channel waveguide, the combination further comprising signal delivery optics and signal recovery optics for focusing said optical signal into and out of said optical waveguide respectively, wherein said optical signal is fed to said signal delivery optics via a single mode optical fiber, said pump is supplied to pump delivery optics and is multi-mode, and said signal recovery optics provide said amplified optical signal emitted from said optical waveguide to a single mode optical fiber.

32. The optical amplifier of claim 31, wherein said optical signal is in the 1300 nm wavelength region.

33. The optical amplifier of claim 15, comprising a fiber optic communications amplifier.

34. The optical amplifier of claim 33, wherein said core comprises a multi-mode channel waveguide, and wherein said optical signal is fed to said signal delivery optics via a single mode optical fiber, said pump is fed to said pump delivery optics and is multi-mode, and said signal recovery optics provide said amplified optical signal emitted from said optical waveguide to a single mode optical fiber.

35. The optical amplifier of claim 34, wherein said optical signal is in the 1300 nm wavelength region.

36. The optical waveguide of claim 17, wherein said core comprises a doped phosphate glass.

37. The optical amplifier of claim 14, wherein said core and cladding comprise dissimilar materials.

38. The optical amplifier of claim 37, wherein said core and cladding are structurally and/or chemically distinct having been separately fabricated as physically different materials and brought together during assembly.

39. The optical amplifier of claim 38, wherein said first and second material are adhesively attached in said waveguide.

40. The method of claim 22,
    wherein said inputting said optical signal includes using signal delivery optics in optical proximity to said optical waveguide for focusing said optical signal into said core through said first coating over said input surface of said optical waveguide; and
    wherein said inputting said pump includes using pump delivery optics disposed near said optical waveguide and at an angle to said propagation axis of said core, said pump delivery optics focusing said pump for reflection off said first coating and into said core at said input surface.

41. The method of claim 40, wherein said optical signal is a fiber optic communications signal, wherein said core comprises a multi-mode channel waveguide, and wherein said optical signal is fed to said signal delivery optics via a single mode optical fiber, said pump is fed to said pump delivery optics and is multi-mode, the method further comprising:
    using signal recovery optics to provide said amplified optical signal emitted from said optical waveguide to a single mode optical fiber.

42. The method of claim 41, wherein said optical signal is in the 1300 nm wavelength region.

43. The method of claim 22, wherein said core and cladding comprise dissimilar materials.

44. The method of claim 43, wherein said core and cladding are structurally and/or chemically distinct having been separately fabricated as physically different materials and brought together during assembly.

45. The method of claim 44, wherein said first and second material are adhesively attached in said waveguide.

* * * * *